United States Patent [19]

Hansen et al.

[11] Patent Number: 4,703,773
[45] Date of Patent: Nov. 3, 1987

[54] VALVE ARRANGEMENT WITH AT LEAST TWO DIAPHRAGMS

[75] Inventors: Svend Hansen; Laurits B. Rasmussen, both of Sønderborg; Jørn H. Klausen, Nordborg, all of Denmark

[73] Assignee: Danfoss A/S, Nordborg, Denmark

[21] Appl. No.: 902,862

[22] Filed: Sep. 2, 1986

Related U.S. Application Data

[63]. Continuation of Ser. No. 652,284, Sep. 20, 1984, abandoned, and a continuation of Ser. No. 803,438, Dec. 2, 1985, abandoned.

[51] Int. Cl.$^4$ .............................................. F16K 11/10
[52] U.S. Cl. .................................... 137/597; 251/61.1
[58] Field of Search ................. 137/597, 82; 251/61.1, 251/331

[56] References Cited

U.S. PATENT DOCUMENTS

| | | | |
|---|---|---|---|
| 3,011,758 | 12/1961 | McFarland | 251/331 |
| 3,521,850 | 7/1970 | German | 251/61.1 X |
| 3,889,711 | 6/1975 | Hiaro | 251/61.1 X |
| 3,952,760 | 4/1976 | Caldwell | 137/82 |
| 4,244,554 | 1/1981 | Dimauro | 251/61.1 X |

Primary Examiner—Alan Cohan
Attorney, Agent, or Firm—Wayne B. Easton; Clayton R. Johnson

[57] ABSTRACT

The invention relates to a diaphragm type valve assembly for a nozzle burner of a heating oil pump. This type of equipment two or more diaphragm type regulating valves or valve sections are utilized with each such valve or valve section having an individual diaphragm therefor. The improvement herein is for a valve assembly having a plurality of diaphragm type valve sections but only a single diaphragm unit is used for all of the valve sections instead of a separate diaphragm for each valve section.

5 Claims, 10 Drawing Figures

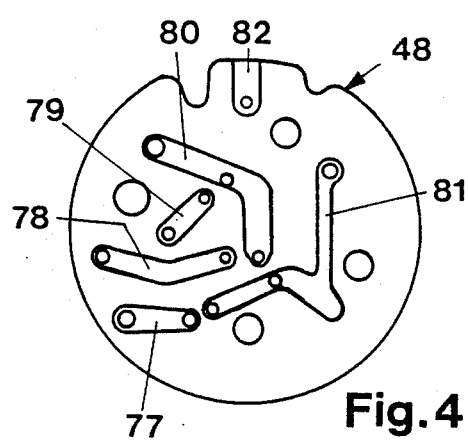
Fig. 4
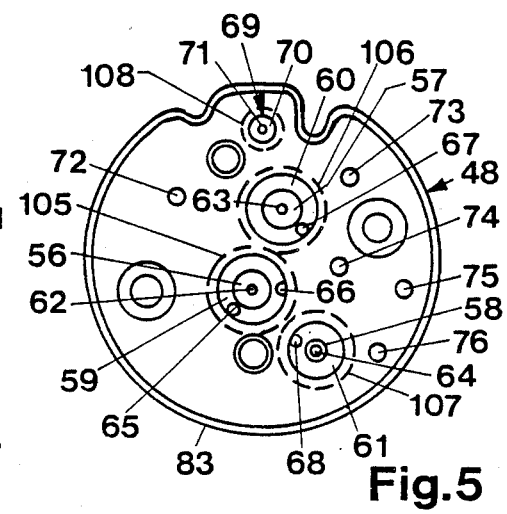
Fig. 5
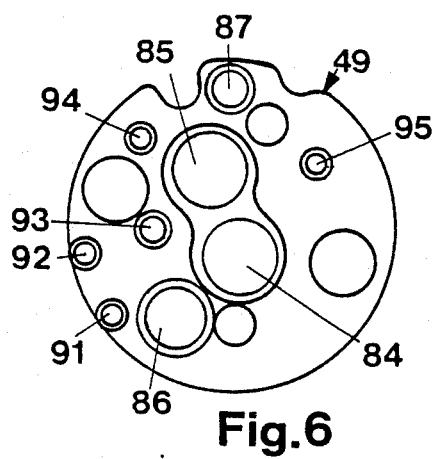
Fig. 6
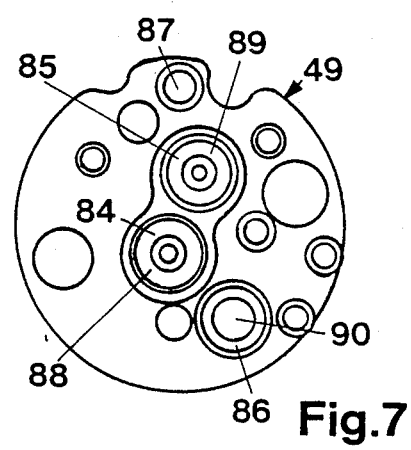
Fig. 7
Fig. 8
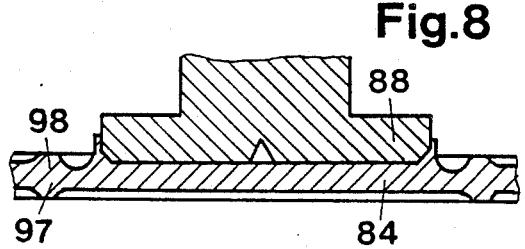
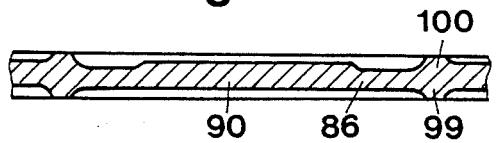
Fig. 9
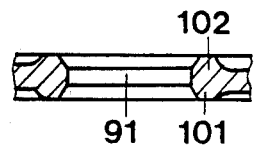
Fig. 10

VALVE ARRANGEMENT WITH AT LEAST TWO DIAPHRAGMS

This is a continuation of Ser. No. 652,284, filed Sept. 20, 1984, and Ser. No. 803,438 filed Dec. 2, 1985, both now abandoned.

The invention relates to a valve arrangement with at least two diaphragm valves which are connected to a common passage system and of which the diaphragms are respectively clamped between first and second clamping faces formed on two housing parts, a valve seat and a valve chamber surrounding same being disposed within the one clamping face and a loading apparatus being disposed within the other clamping face, particularly for a nozzle burner with a heating oil pump.

One known valve arrangment of this kind is so associated with a nozzle burner with a heating oil pump that the oil pressure at the nozzle can assume two different valves and consequently different amount of oil can be introduced in the combustion chamber. For this purpose, two pressure regulating valves in the form of diaphragm valves are provided of which the pressure is adjustable by means of an adjustable spring. Both valves are disposed between the pressure side of the pump and the return side, the pressure regulating valve of lower pressure being in series with a switching valve, namely a magnetic valve. In the supply line to the nozzle, there is a further diaphragm valve which opens only when the pump pressure has exceeded a predetermined value, and a cut-off valve designed as a magnetic valve. The assembly of the individual diaphragm valves, particularly clamping of the diaphragms, calls for considerable production expense. In addition, one requires adequate space for accommodating the individual valves.

The invention is based on the problem of providing a valve arrangement of the aforementioned kind which is easier to assemble and can be accommodated in less space.

This problem is solved according to the invention in that the diaphragms are formed as one-piece sections of an elastic valve plate and the first clamping faces are provided on a common first housing part and the second clamping faces are provided on a second common housing part.

By reason of the fact that the diaphragms as well as the first and second clamping faces are combined on one structural element, assembly is simple. To clamp the diaphragms of all the diaphragm valves, only three parts have to be aligned with each other and then clamped together. These three parts have an adequate size to be manipulated. Nevertheless, the individual diaphragm valves can be very closely juxtaposed to require little space.

The valve plate may comprise at least one further diaphragm section forming an oscilation damping chamber together with a depression in the one common housing part. This chamber requires only slightly more expense because the parts required to form the chamber are already provided.

It is also favourable for the diaphragm sections to be surrounded at least on one side by a clamping bead. In this way, one obtains defined clamping zones so that the diaphragms in one piece with the valve plate will always have the same effective surface. In addition, the clamping beads form a seal which seal the chambers bounded by the diaphragm in the plane of the plate.

Preferably, the diaphragm sections are reinforced at least in the region of the valve seat. This makes it easier to use the diaphragm sections directly as closing members.

The reinforcement can in the simplest case be formed by a zone of larger material thickness than the remainder of the diaphragm section.

When the valve is loaded with a large force, it is advisable to form the reinforcement from a supporting element secured to the valve plate. For example, the supporting element can be vulcanised directly onto the valve plate.

In a further embodiment of the invention, the passage system has sections extending to both sides of the valve plate and, beyond the diaphragm sections, the valve plate has apertures which are sealed by clamping between the common housing parts to connect the passage system sections. This allows a large amount of freedom in designing the passage system particularly in the sense of space-saving use of the available components. Within the valve plate, there is generally enough space available for such apertures beyond the diaphragm sections.

The apertures are desirably also surrounded by clamping beads which bring about a secure seal of the aperture when the two common housing parts are clamped together.

Further, at least on one side of the valve plate the chamber beyond the clamping faces or clamping beads can be connected to the low pressure side of the passage system. This relieves the valve plate and allows any leakage oil to be led away without problem.

From a constructional point of view, it is advisable for the first common housing part to have a plate-shaped zone, to carry the valve seats and clamping faces on the side facing the valve plate, to bound sections of the passage system on the opposite side, and to be traversed by supply and withdrawal passages. In particular, the sections of the passage system can be formed in the plate-shaped zone by grooves covered by a cover plate. This permits the passage system to be accommodated in a small space even if the passages follow a complicated course.

With particular advantage, the second common housing part has a free end face extending substantially parallel to the valve plate and, extending therefrom, axial bores for receiving a respective loading apparatus and an associated adjusting apparatus. This permits the loading apparatus to be accommodated in the smallest possible space and to be adjusted from the outside after assembly.

Further, end faces and/or circumferential faces of the second common housing part may have connecting orifices which communicate with the passage system. For example, when the arrangement is finally assembled, this permits the connection of the nozzle conduit, a manometer, a pump pressure tapping, a suction pressure tapping, the suction conduit or the return conduit.

Also, a magnetic valve attachment with closing member may be insertable in a valve seat provided in the connecting orifices. This provides additional possibilities to connect switching valves to the diaphragm valves.

In a preferred embodiment, the first common housing part, the valve plate and the second common housing part with the exposed end face adjoin the end of a gear pump. This leads to a very compact construction of the gear pump and valve arrangement.

In particular, the second common housing part may be adjoined by a circumferential wall which engages over the housing of the gear pump, the first common housing and the valve plate. In this way, the valve plate and the first common component are accommodated whilst being well protected. The space between the pump housing and the circumferential wall can accommodate a screen and be under suction pressure so that no difficulties will be presented to keep the parts of the valve plate beyond the clamping points under suction pressure.

A preferred example of the invention will now be described with reference to the drawing, in which:

FIG. 4 is a view of the side of the first common component remote from the valve plate;

FIG. 5 is a view of the FIG. 4 component from the side facing the valve plate;

FIG. 6 is an elevation of a valve plate from the side facing the FIG. 4 component;

FIG. 7 is an elevation of the opposite side of the valve plate of FIG. 6;

FIG. 8 is a section in the region of the diaphragm section of a pressure regulating valve in the transverse path;

FIG. 9 is a section in the region of the diaphragm section of a pressure regulating valve in the longitudinal path;

FIG. 10 is a section in the region of an aperture.

Figure 1:
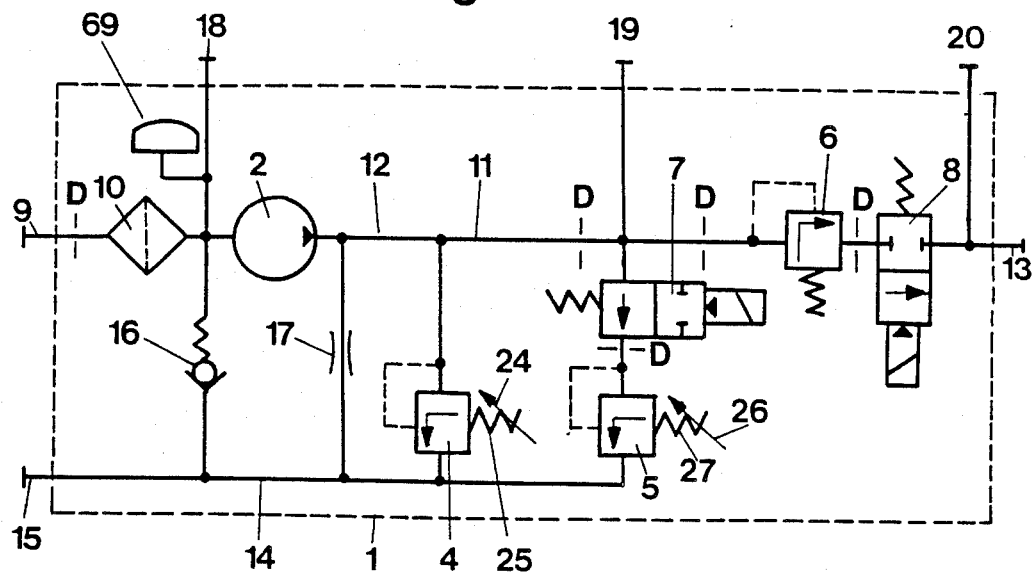
FIG. 1 is a circuit diagram of a heating oil pump with a valve arrangement constructed according to the invention.

FIG. 1 shows an oil pump unit 1. It comprises a gear pump 2, three pressure regulating valves, 4, 5, and 6 in the form of diaphragm valves and two magnetic valves 7, and 8 in the form of switching valves. The gear pump 2 is adapted to suck oil through a suction conduit connection 9 by way of a filter 10 and to convey it into the pressure conduit 11 of a passage system 12. When the magnetic valve has been opened and the oil pressure exceeds the opening pressure of the pressure regulating valve 6, the oil reaches the nozzle connection 13. The pressure regulating valve 4 is set to a higher pressure than the pressure regulating valve 5. The magnetic valve 7 is open in its rest position. Consequently, the pressure in the pressure conduit 11 is held at the set lower pressure by the pressure regulating valve 5. The amount of oil delivered by way of the nozzle conduit 13 is of an appropriate size. On the other hand, if the magnetic valve 7 is closed, the pressure in the pressure conduit 11 rises to the pressure pre-determined by the pressure regulating valve. The amount of oil delivered by the nozzle is correspondingly larger. The excess oil reaches the return conduit 14 from which it can flow back to the container by way of the return connection 15 in the case of a two-path installation or to the suction side of the gear pump 2 by way of a check valve 16 in the case of single-path installation. As long as the pump pressure is too small to allow one of the pressure regulating valves, 4, 5 or 6 to open, it can be reduced towards the return side by way of a throttle 17. The section pressure may be tapped at a connecting orifice 18, the pump pressure at a connecting orifice 19 and the nozzle pressure at a connecting orifice 20. The connecting orifice 19 can also be used for venting.

Figure 2:
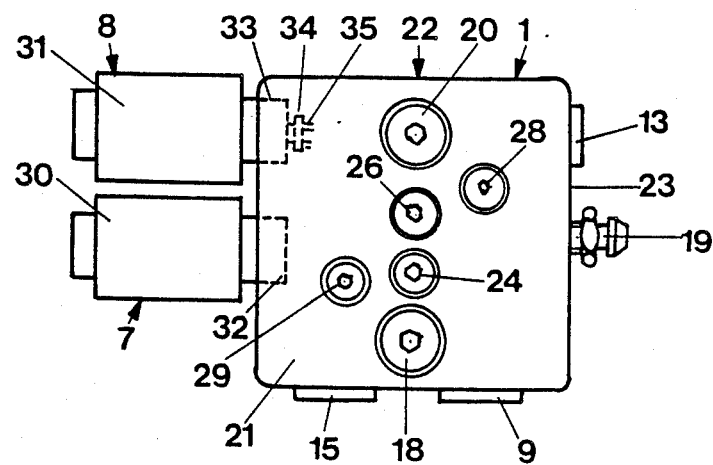
FIG. 2 is a reduced view from the left onto the FIG. 3 construction.

FIG. 2 shows the end 21 of the pump unit 1. It has a cover 22 at the circumferential face 23 of which there are arranged the suction connection 9, the nozzle connection 13, the return connection 15 and the pump pressure connection 19 whereas the suction 18 and the nozzle pressure connection 20 are provided at the end 21. In the end there is also a set screw 24 for the load spring 25 of the pressure regulating valve 4 of higher pressure and a set screw 26 for the load spring 27 of the pressure regulating valve 5 of lower pressure. In addition, the heads of two clamping screws 28 and 29 are visible. Each of the magnetic valves 7 and 8 has an attachment 30 or 31 inserted in a further connecting orifice 32 or 33 of the circumferential face 23 of the cover 22. Each attachment carries a closing member 34 co-operating with a valve seat 35 provided in the cover 22.

Figure 3:
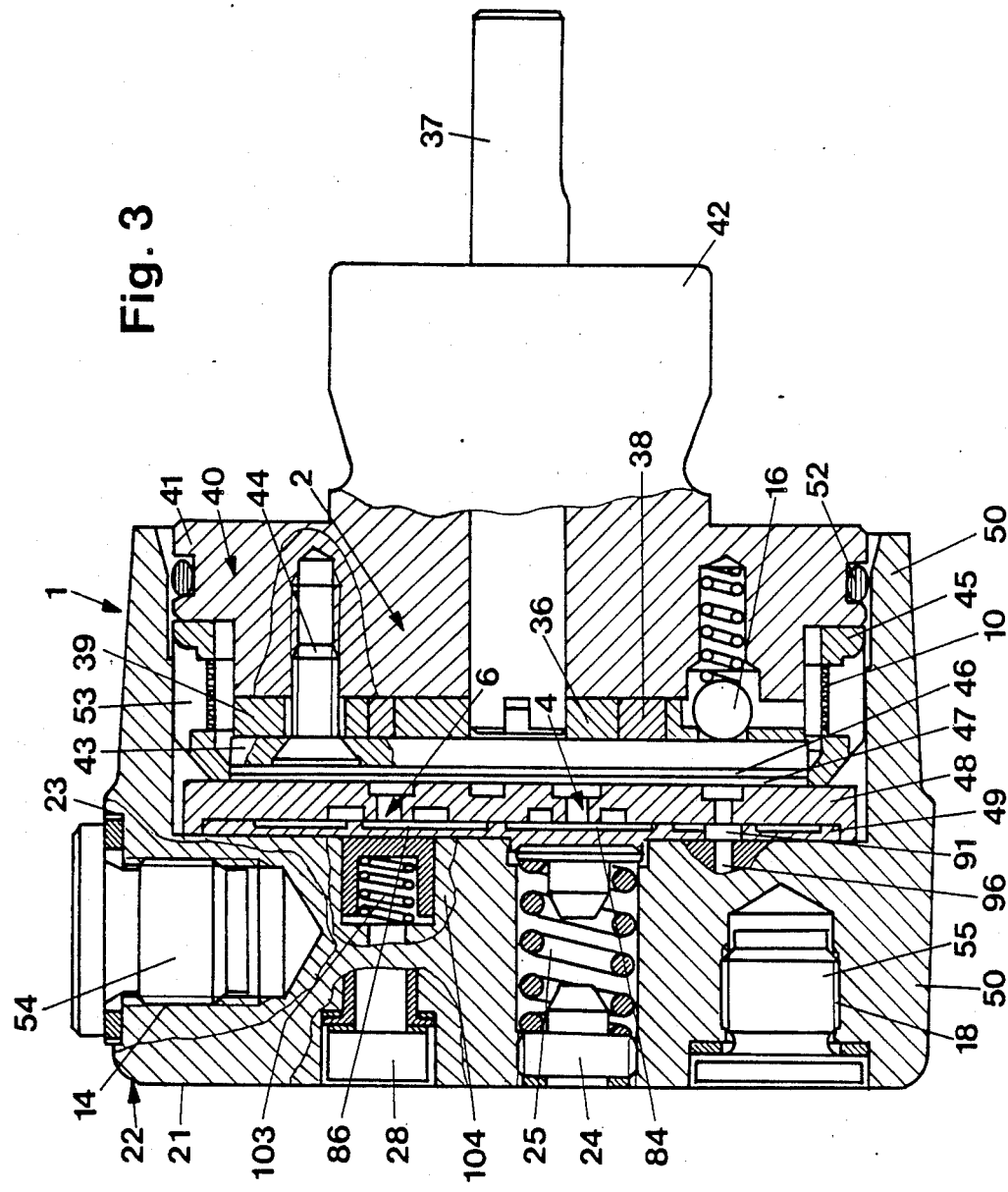
FIG. 3 is an enlarged longitudinal section through the FIG. 2 construction, the valve plate being illustrated in simplified form.

FIG. 3 is a longitudinal section through the pump unit 1. The gear pump 2 has an externally toothed gear 36 driven by a shaft 37. It engages an internally toothed gear ring 38 which can run around in a guide ring 39. The pump housing 40 is formed by this guide ring, the flange 41 of a bearing housing 42 and an end plate 43, which are interconnected by screws 44. The valve housing 40 is surrounded by an annular insert 45 carrying the filter 10. The valve housing also accommodates the check valve 16.

Beyond the end plate 43, there is a diaphragm plate 46 and a sealing plate 47. This is followed by a plate-shaped first common component 48, a common valve plate 49 and the cover 22, all of the foregoing being held together by the screws 28. The cover 22 has a plate-shaped portion serving as a second common component 50, and a circumferential wall 51 which engages over the valve house 40 and is sealed therefrom by means of a sealing ring 52. The interior 53 thus formed communicates with the suction side of the pump 2. The drawing shows the return connection 15 and the suction connection 18 which, if they are not used, are sealed by screw plugs 54 or 55.

It will be seen from FIGS. 4 and 5 that the plate-shaped first common component 48 has on the side facing the valve plate a valve seat 56 for the pressure regulating valve 4, a valve seat 57 for the pressure regulating valve 5 and a valve seat 58 for the pressure regulating valve 6. All the valve seats are surrounded by a respective annular groove shaped valve chamber 59, 60 or 61. Within the valve seats there are axial passages 62, 63 and 64 and in the region of the valve chambers there are axial passages 65 or 66, 67 and 68. Further, to form a sound damping chamber 69 provision is made for a depression 70 with an axial passage 71. In addition, there is a plurality of axial passages 72, 73, 74, 75, and 76. All the axial passages communicate with grooves 77, 78, 79, 80, 81 and 82 on the side opposite the valve plate 49 and they are in turn closed by the sealing disc 47. A margin 83 serves to locate the valve plate 49.

As will be evident from FIGS. 6 and 7, the valve plate 49, which is made from the same elastic material throughout, comprises 4 diaphragm sections made in one piece therewith, namely the diaphragm section 84 for the pressure regulating valve 4, the diaphragm section 85 for the pressure regulating valve 5, the diaphragm section 86 for the pressure regulating valve 6 and the diaphragm section 87 for the oscillation damper 69. For reinforcement, supporting elements 88 and 89 of metal are vulcanised on in the vicinity of the diaphragm sections 84 and 85 as is shown in FIGS. 7 and 8. A zone of larger wall thickness is provided in the region of the diaphragm section 86 for reinforcement. In addition, the valve plate 49 has apertures 91, 92, 93, 94, and 95 which correspond to the axial passages 72 to 76 and corresponding passages in the second common component 50, as is shown for the passage 96 in FIG. 3. The apertures 91 to 95 of valve plate 49 correspond to the places D, which are shown in FIG. 1.

Around all diaphragm sections 84 to 87 and around all apertures 91 to 95, clamping beads are arranged at both sides of the valve plate 49. For example, FIG. 8 shows the clamping beads 97 and 98 arranged at both sides for the diaphragm zone 84, FIG. 9 shows the clamping beads 99 and 100 provided at both sides for the diaphragm zone 86 and FIG. 10 shows the clamping beads 101 and 102 provided at both sides in the region of the aperture 91. The other apertures in the first common component 48 and in the valve plate 49 serve for the passage of the screws 28 or to reach the screws 44.

As is shown in FIG. 3, the load spring 25 of pressure regulating valve 4 adjustable by the adjusting screw 24 acts on the supporting element 88. The adjustable load on the pressure regulating valve 5 corresponds. The pressure regulating valve 6 is loaded by a spring 103 of fixed bias acting by way of a cup-shaped element 104 on the diaphragm zone 86.

Assembly of the pump unit 1 is very simple. After the pump 2 has been assembled in its housing 40, it is merely necessary to push the insert 45 there over, to place the diaphragm plate 46, sealing plate 47, plate-shape first common component 48 and the valve plate 49 in front and to push the cover 22 there over, whereupon everything is clamped together by the screws 28. This automatically results in clamping faces in the region of the clamping beads 97-102 when abutting against the two adjacent common components 48 and 50, as is shown by the broken lines 105, 106 107 and 108 in FIG. 5.

The valve arrangement described is also suitable for circuits different from that of FIG. 1. For example, the pressure regulating valve 5 and the magnetic valve 7 may be interchanged. This is sometimes of interest if a pressure is to be tapped between these two valves. The principle as described is also suitable for other applications, for example for hydraulic controls, for refrigeration installations or the like. The annular beads can also be omitted, as is shown in FIG. 3, or provided only on one side of the valve plate 48.

We claim:

1. A multi-valve assembly for controlling liquid flow, comprising, first and second housing parts, said first housing part having a valve face with a plurality of ports, each of said ports being surrounded by an annularly shaped valve seat defined by and surrounded by an annularly shaped channel, a single elastic diaphragm unit clamped between said housing parts in engagement with said valve face, said diaphragm unit having a plurality of diaphragm sections respectively aligned with said ports for controlling liquid flow through said ports to the repective surrounding channel and a generally planar main body joined to the diaphragm sections and surrounding the diaphragms sections, said housing parts having flat surface portions surrounding said annular channels and sandwiching said diaphragm unit therebetween, the diaphragm unit having a raised circular clamping first bead portion on one side thereof for each diaphragm section that is of a larger diameter than each of the diaphragm sections and the annular shaped channel for the port controlled by the respective diaphragm section and that abuts against the adjacent flat surface, each first bead portion surrounding the respective diaphragm section, being joined to the main body to extend in raised relationship thereto and being laterally unsupported by and having no lateral contact with either of said housing parts and being biased in an axial direction into sealing and clamping engagement with the adjacent one of said housing part flat surface portions, a support member for each diaphragm section that is joined to the respective diaphragm section to extend therefrom in a direction away from the valve seat that the respective diaphragm section controls, loading means mounted by the second housing part and engaging at least one of the support members for moving the engaged support member and thereby the diaphragm section that the last mentioned support member is joined to between a position spaced from the respective valve seat and a position abutting against the last mentioned valve seat, said housing parts and said diaphragm body having at least one set of axially aligned fluid passage holes, the first housing part and diaphragm body holes extending axially therethrough, said housing parts having flat surface areas respectively surrounding said aligned holes therein, said diaphragm unit having on both sides thereof raised clamping second bead portions in surrounding relationship to each of the unit holes and in respective sealing and clamping engagement with said flat surface areas of both of said housing parts, the second bead portions being joined to the main body and extending in raised relationship to the main body and laterally unsupported by and having no lateral contact with either of said housing parts and means for securing the first housing part to the second housing part with the first and second bead portions clamped between said housing parts.

2. A multi-valve assembly accoriding to claim 1 wherein the diaphragm unit has for each diaphragm section a circular raised clamping bead portion of the side thereof opposite the first mentioned bead portions and in axial alignment with the first mentioned bead portion that is in sealing and clamping engagement with the adjacent housing part flat surface portion and that the first housing part has a raised peripheral portion surrounding its holes and channels and extending toward the second housing part to located the diaphragm unit.

3. A multi-valve assembly according to claim 1 in that the loading means includes a separate loading means for each of the support members for moving the support members independent of one another, and that the diaphragm unit has a raised clamping bead joined to the main body, surrounding each support member and being in clamping and fluid sealing relationship to the housing second part.

4. The apparatus of claim 3 wherein there is provided an oil pumping unit that includes a pump housing having an end plate mounted on the pump housing to in conjunction therewith provide an interior chamber, the cover including the second housing part, the first housing part comprising a plate-shaped component removably mounted in the chamber and having the first part valve seats, ports, holes and channels, and fluid sealing means between said component and the end wall, said component having a plurality of liquid passage grooves opening to said sealing means and being on the component side opposite the valve face, each port opening to a different groove, a first axial passage for each channel opening to the respective channel and to a groove other than the groove that the port surrounded by the last mentioned channel opens to, the diaphragm unit having an axial second passage for each first axial passage and opening thereto and the cover having passageways opening to the diaphragm passages, said end wall having a liquid passage for each first housing part hole and opening thereto and said cover having a liquid passage for each second housing part hole that includes the respective second housing part hole.

5. The apparatus of claim 4 further characterized in the cover has a bore for each separate loading means that opens to the chamber adjacent a diaphragm section, and that the loading means is mounted in the bore and bears against the support member for the respective diaphragm section.

* * * * *